April 29, 1952 S. S. SWANSON 2,595,021
MEASURING DEVICE
Filed July 31, 1946
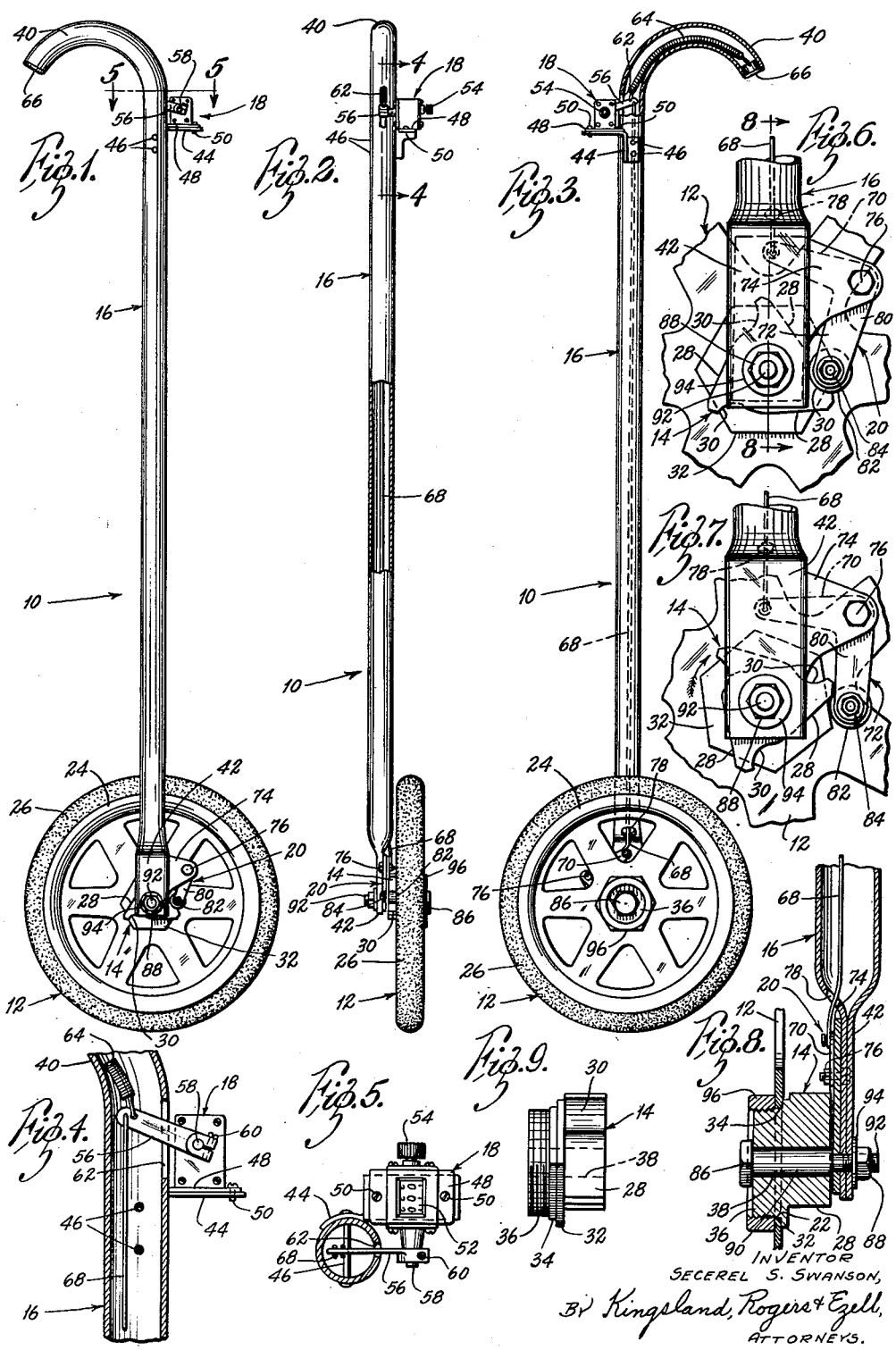
INVENTOR
SECEREL S. SWANSON,
BY Kingsland, Rogers & Ezell,
ATTORNEYS.

Patented Apr. 29, 1952

2,595,021

UNITED STATES PATENT OFFICE 2,595,021

MEASURING DEVICE

Secerel S. Swanson, Dallas, Tex.

Application July 31, 1946, Serial No. 687,303

4 Claims. (Cl. 33—141)

1

The present invention relates generally to measuring devices, and more particularly to a wheeled device for obtaining lineal measurements.

An object of the present invention is to provide a novel measuring device which may be handled readily and easily manually, and by which lineal measurements of reasonable accuracy are obtained.

Another object is to provide a novel measuring device of the wheeled type which measures lineal footage when moved in one direction and which does not register when moved in the opposite direction.

Another object is to provide a novel measuring device of the wheeled type that incorporates a novel cam mechanism that trips a counter when rotated in one direction and which is locked when attempted to be rotated in the opposite direction.

Another object is to provide a novel measuring device which may be readily zeroed to a starting point.

Another object is to provide a novel measuring device of the wheeled type which is adapted to be operated for obtaining a measurement in any position of the device so long as the surface to be measured is contacted by the wheel of the device.

Other objects are to provide a measuring device of the wheeled type which is simple in construction, which is sturdy and adapted to give long service, which is readily fabricated, which requires a minimum amount of maintenance, and which may be operated with maximum efficiency after minimum instruction.

The foregoing and other objects and advantages are apparent from the following description taken with the accompanying drawing, in which:

Fig. 1 is a side elevational view of a measuring device constructed in accordance with the teachings of the present invention;

Fig. 2 is a rear elevational view thereof, a portion of the handle being in cross section to show additional details;

Fig. 3 is a side elevational view thereof at 180° to Fig. 1, the upper portion of the handle being in section to illustrate additional details;

Fig. 4 is an enlarged fragmentary cross-sectional view taken on the line 4—4 of Fig. 2;

Fig. 5 is an enlarged cross-sectional view taken on the line 5—5 of Fig. 1;

Fig. 6 is an enlarged fragmentary elevational view illustrating the cam and counter actuator bell crank in cam-blocked relation;

Fig. 7 is an enlarged fragmentary elevational view similar to Fig. 6, showing the cam and the counter actuator bell crank in counter actuating relation;

2

Fig. 8 is a cross-sectional view taken on the line 8—8 of Fig. 6; and

Fig. 9 is a plan view of one cam face of the cam member and of its related parts.

Referring to the drawing more particularly by reference numerals, 10 indicates generally a measuring device embodying the concepts of the present invention. Broadly, the measuring device 10 includes a wheel 12, a cam member 14, a handle 16, a counter 18, a counter actuator mechanism 20, and associated mounting and securing elements.

The wheel 12 may be a metal stamping of the configuration shown, which includes a large central aperture 22. An integral concave rim 24 receives a solid rubber tire 26.

The cam member 14 includes three faces 28 in each of which is a transverse groove 30 of arcuate cross section. The cam member 14 also includes a shoulder 32, a wheel seat 34, and a threaded extension 36. A centrally located bore 38 extends through the cam member 14.

The handle 16 is tubular in cross section throughout the major portion of its length, and includes a curved hand portion 40 and a flattened attaching portion 42 having an aperture therethrough. A bracket 44 is secured to the handle 16 near the hand portion 40 by bolt assemblies 46. The bracket 44 supports the counter 18, a base plate 48 thereof being secured to the bracket 44 by suitable screws 50.

The counter 18 includes a dial 52 (Fig. 5), a zeroing knob 54, and an actuator lever 56 which is secured to an actuator shaft 58 by a screw 60. The internal construction of the counter 18 forms no part of the present invention, and, therefore, is not described in detail. Any available counter may be employed. The actuator lever 56 extends through an opening 62 into the tubular handle 16, and has connected thereto a tension spring 64 (Fig. 3), the other end of the spring 64 being anchored to an end cap 66 which closes the free end of the hand portion 40 of the handle 16. The spring 64 biases the actuator lever 56 upwardly at all times. One end of a wire 68 is also connected to the actuator lever 56, the other end thereof being connected to one arm 70 of a counter actuator bell crank 72, which is pivotally mounted on a plate 74 by means of a bolt assembly 76. The wire 68 lies within the handle 16, exiting therefrom at its lower end through an opening 78 in the handle 16 to make connection with the said arm 70. The other arm 80 of the bell crank 72 carries a roller 82 pivoted to its free end by a bolt assembly 84.

The plate 74 and the cam member 14 are secured to the flat portion 42 of the handle 16 by a bolt 86 and a nut 88. The bolt 86 includes a bearing portion 90 and a reduced threaded portion 92, the bearing portion 90 being of slightly greater length than the width of the cam member 14. An aperture in the plate 74 and the aperture in the flat portion 42 of the handle 16 are of a size to snugly receive the reduced threaded portion 92 and, hence, abut the shoulder formed at the juncture of the reduced portion 92 and the bearing portion 90 of the bolt 86. A washer 94 is disposed between the nut 88 and the flattened portion 82. Hence, the cam member 14 is free to rotate on the bearing portion 90 in respect to the handle 16 and the plate 74. The wheel 12 snugly engages the wheel seat 34 of the cam member 14 by means of its central aperture 22, and is firmly forced against the shoulder 32 by a nut 96 which threadedly engages the threaded extension 36.

The operation of the measuring device 10 is relatively simple, yet is positive both in measuring action and in zeroing the device to a starting point. In a preferred measuring device 10, the circumference of the rubber tire 26 is one yard and, hence, to measure in feet, each cam surface 28 of the cam member 14 actuates the counter 18 one time during a revolution of the wheel 12. Considering Figs. 1, 6, and 7, as the device 10 is rolled to the right, the cam member 14 rotates clockwise. The roller 82 pivoted on the counter actuator bell crank 72 tracks the cam surfaces 28 continuously and trips the actuator lever 56 as it rolls from one cam surface to the succeeding cam surface. It is clear from the drawing that the bell crank lever 72 reaches its maximum position of counterclockwise movement (Fig. 7) as the roller 82 is leaving one cam surface 28 to begin its travel on the succeeding cam surface 28. The actuator lever 56 is so related to the mechanism of the counter 18 through the actuator shaft 58 that the counter mechanism is tripped as the roller 82 thus reaches its point of maximum travel from the center of the cam member 14. The screw 60 provides means for adjusting the actuator lever 56 to achieve the desired tripping effect. The spring 64 constantly urges the actuator lever 56 upwardly and, hence, through the wire 68, also maintains the roller 82 in continuous tracking contact with the cam surfaces 28.

When the device 10 is rolled to the left (Fig. 1), the movement is stopped as the roller 82 drops into the first groove 30 (Fig. 6). Thereafterwards, the wheel 12 is locked and it then slides in further movement to the left. Positive locking action obtains between the roller 82, its lever arm 80, and the cam member 14 so that the roller 82 cannot ride out of the groove 30 in which it rests in this backward movement of the device 10, due to the fact that a line through the pivot bolt assembly 76 and the pivot bolt assembly 84 extended towards the groove 30 falls well within the right hand limit thereof. Hence, the force applied to the cam member 14 by the attempted backward rotation of the wheel 12 tends to rotate the roller 82 and its lever arm 80 clockwise, which firmly seats the roller 82 in the groove 30, inasmuch as the roller 82 cannot pass over center in respect to the two fixed points established by the pivot bolt assembly 76 and the bolt 86. Were the right hand extremity of the groove 30 to the left of a line drawn through the axes of the bolt assemblies 76 and 84 and extended, the roller 82 would track out of the groove 30 and onto the next cam surface 28 upon backward movement of the wheel 12, which would defeat the zeroing objective of the present invention, since such tracking movement of the roller 82 would trip the mechanism of the counter 18. With the present novel arrangement, the counter 18 may be zeroed by manipulation of the zeroing knob 54 while the device 10 is located at a point in advance of a predetermined starting point, whereupon the device 10 may be moved backwards to the starting point in a sliding action due to the roller 82 locking the cam member 14 through seating in a groove 30, thereby preventing actuation of the counter 18 and maintaining the zero status thereof.

It is apparent that there has been provided a measuring device which fulfills all of the objects and advantages sought therefor.

It is to be understood that the foregoing description and the accompanying drawing have been given by way of illustration and example.

It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A measuring device comprising, in combination, a wheel, an elongated member having the lower end supported by said wheel, a counter mounted adjacent the upper end of said member, a cam member rotatable with said wheel and including a cam surface, means for tripping said counter actuated by said cam surface, and means locking said tripping means and said cam member upon attempted backward rolling of said wheel, including a groove in said cam surface engageable by said tripping means.

2. A measuring device, comprising, in combination, a wheel, an elongated member having the lower end supported by said wheel, a counter adjacent the upper end of said member, a cam member rotatable with said wheel and including a plurality of cam surfaces, means for tripping said counter actuated by said cam surfaces, and means locking said tripping means and said cam member upon attempted backward rolling of said wheel, including grooves in said cam surfaces engageable by said tripping means.

3. A measuring device comprising, in combination, a wheel, a handle supported thereby, a counter, a cam member rotatable with said wheel including a plurality of cam surfaces disposed about a center point, a cam follower member including a roller, means connecting said cam follower member with said counter so that said counter is tripped once as each cam surface is traversed by said roller, means biasing said roller into cam contacting position, and means for locking said roller with said cam member effective upon attempted backward rolling of said wheel to prevent tripping of said counter, said means including a groove in each cam surface to receive and check the movement of said roller.

4. A measuring device comprising, in combination, a handle, a counter mounted on said handle, a cam member connected to said handle for rotation in respect thereto, a wheel secured to said cam member, said cam member being rotatable with said wheel, said cam member including a plurality of cam surfaces, a tracking member mounted on a pivot fixed in respect to said handle, means biasing said tracking member into continuous tracking engagement with said cam surfaces, means responsive to tracking movement of said tracking member for tripping said counter one time for each cam surface tracked thereby in the rotation of the cam member occasioned by movement of the wheel over a surface being measured, and means preventing tracking movement of said tracking member upon backward rolling movement of said wheel whereby tripping of said counter is prevented, said last means including a groove in each cam surface contoured to receive the tracking member and to prevent it from riding therefrom upon attempted continued rearward rolling movement of the wheel.

SECEREL S. SWANSON.

REFERENCES CITED

The following references are of record in the file of this patent:

UNITED STATES PATENTS

| Number | Name | Date |
| --- | --- | --- |
| 275,734 | Von Reitzner | Apr. 10, 1883 |
| 370,212 | Sands | Sept. 20, 1887 |
| 437,065 | Wells | Sept. 23, 1890 |
| 766,942 | Ek | Aug. 9, 1904 |
| 882,191 | Finn | Mar. 17, 1908 |
| 1,263,493 | Washburn | Apr. 23, 1918 |
| 1,835,804 | Morra | Dec. 8, 1931 |
| 2,123,360 | Harris | July 12, 1938 |
| 2,129,979 | Westervelt | Sept. 13, 1938 |

FOREIGN PATENTS

| Number | Country | Date |
| --- | --- | --- |
| 384,791 | Great Britain | Dec. 15, 1932 |